United States Patent [19]

Morello

[11] Patent Number: 5,960,662

[45] Date of Patent: Oct. 5, 1999

[54] APPARATUS FOR ATTACHING A CRANE TO A SHEET METAL ROLL FORMING MACHINE

[75] Inventor: Frederick Morello, Johnstown, Pa.

[73] Assignee: M.I.C. Industries, Inc., Reston, Va.

[21] Appl. No.: 09/089,493

[22] Filed: Jun. 2, 1998

[51] Int. Cl.⁶ .............................. B21D 5/08; B21D 43/00
[52] U.S. Cl. ............................... 72/166; 72/168; 72/177; 72/181; 72/419
[58] Field of Search .............................. 72/181, 180, 446, 72/166, 419, 420, 168, 177, 183, 483

[56] References Cited

U.S. PATENT DOCUMENTS

| | | |
|---|---|---|
| 892,320 | 6/1908 | Smith . |
| 3,710,607 | 1/1973 | Beymer ..................................... 72/181 |
| 3,800,966 | 4/1974 | Newton . |
| 3,972,358 | 8/1976 | Kappler . |
| 4,091,943 | 5/1978 | Bay-Schmith . |
| 4,424,985 | 1/1984 | Holmes ..................................... 254/423 |
| 4,660,399 | 4/1987 | Suter ........................................... 72/181 |
| 4,921,217 | 5/1990 | Kies ....................................... 254/29 R |
| 5,014,863 | 5/1991 | Vlaanderen . |
| 5,249,445 | 10/1993 | Morello ..................................... 72/168 |
| 5,315,853 | 5/1994 | Scheiterle ................................. 72/178 |
| 5,425,259 | 6/1995 | Coben ....................................... 72/181 |
| 5,725,346 | 3/1998 | Davina . |

*Primary Examiner*—Daniel C. Crane
*Attorney, Agent, or Firm*—Rothwell, Figg, Ernst & Kurz

[57] ABSTRACT

A roll forming device has a trailer having a hitch mechanism at a front end and a plurality of wheels, a sheet metal roll forming apparatus mounted to the trailer and a crane mounted to the trailer for moving materials to the roll forming apparatus. An outrigger system is also provided that includes front stabilizer jacks. In addition, rear leveling jacks are also provided proximate the rear end of the trailer.

35 Claims, 6 Drawing Sheets

5,960,662

APPARATUS FOR ATTACHING A CRANE TO A SHEET METAL ROLL FORMING MACHINE

BACKGROUND OF THE INVENTION

1. Field of the Invention

The present invention relates to automatic building machines for roll forming sheet metal materials. In particular, the present invention relates to moving items such as metal materials to and from such roll forming devices. The present invention provides a crane, and preferably also leveling jacks, to such a roll forming machine in order to lift, e.g., coils of material (e.g., steel or aluminum) onto the automatic building machine. The automatic building machine for roll forming is preferably like that of an ABM™ (Automatic Building Machine) or a UBM™ (Ultimate Building Machine) manufactured by M.I.C. Industries, Inc. of Reston, Va.

2. Background and Prior Art

Roll forming machines (such as those manufactured by M.I.C. Industries, Inc., of Reston, Va., such as at least partially shown in U.S. Pat. Nos. 3,842,647, 3,902,288, 3,967,430, and 4,364,253, all owned by M.I.C. Industries, Inc.) are constructed without cranes integral therewith or attached thereto.

Accordingly, such common devices have a number of drawbacks. For example, in systems where there is no crane available for lifting coil stock onto the roll forming machine, problems exist with lifting a coil of material onto the machine for roll forming processing—especially when, for example, the machine is located in a remote area where no means for lifting coils is readily available.

Although certain mobile pieces of machinery having cranes attached may be known, the provision of a crane in the manner of the present invention and the benefits therefrom have not hitherto been contemplated nor appreciated by those in the art.

SUMMARY OF THE INVENTION

As discussed above, the present invention provides a unique combination of a crane (and preferably also leveling jacks) in a roll forming machine, such as for example those constructed by M.I.C. Industries, Inc., of Reston, Va.

Preferably, the crane is mounted proximate the front end of the machine. The front being, for example, the hitch attachment side of a trailer.

Preferably, the crane also has the capability of extending and retracting the boom, as well as lowering and raising the boom.

Preferably, the crane is rotatable at least 360 degrees about a central axis of the crane.

Preferably, the crane is a knuckle-boom type of crane.

Preferably, an integrated outrigger system is also provided which serves as a front stabilizer system during use of the crane.

Preferably, controls for the operation of the crane are located at the front of the machine proximate the location of the crane. Similarly, controls for operating the outrigger system are preferably located proximate the controls for operating the crane.

Preferably, the crane and the outrigger system are hydraulically operated.

According to another preferred aspect of the invention, leveling jacks are placed proximate the rear end of the roll forming machine. The rear end being, for example, the tail-light TL side of a trailer.

Preferably, the leveling jacks are also operated via a hydraulic system.

Preferably, controls for the operation of the leveling jacks are located proximate the controls for operating the crane, but can also be located at the rear of the machine close to the jacks. The leveling jacks can thus provide a stable, level surface during the roll forming process. The leveling jacks can also thus control the overturning moment from the load of the crane.

According to another aspect of the invention, an existing machine can be upgrading to include a crane and leveling jacks and hydraulic lines can be connected for feeding both the crane and the leveling jacks. In this manner, a crane can be utilized to lift coils of material onto the machine for processing.

Hydraulically operated rear leveling jacks and front stabilizer jacks can advantageously provide a level foundation for carrying out the roll forming and are thus highly preferred.

Most preferably, the entire crane assembly, along with the leveling jacks, is integrated into, i.e., fixedly connected to, the frame of a trailer for the roll forming machines. In addition, the hydraulic system for operating these devices is also preferably mounted to the trailer. In this manner, the trailer of the automatic building machine fixedly supports both the automatic building machinery and the crane and jack structures in one single unit.

BRIEF DESCRIPTION OF THE DRAWINGS

The present invention is illustrated by way of example and not limitation in the accompanying drawings, in which like references indicate like parts.

DETAILED DESCRIPTION OF THE PREFERRED EMBODIMENTS

The preferred embodiments of the present invention incorporate a crane with a sheet metal roll forming machine or the like. In the most preferred embodiments, a crane is incorporated into a roll forming machine that is mounted on a trailer. Most preferably, the present invention is incorporated in machines like that of the present assignee, such as an ABM™ (Automatic Building Machine) or a UBM™

(Ultimate Building Machine) manufactured by the present assignee M.I.C. Industries, Inc. of Reston, Va.

Figure 6:
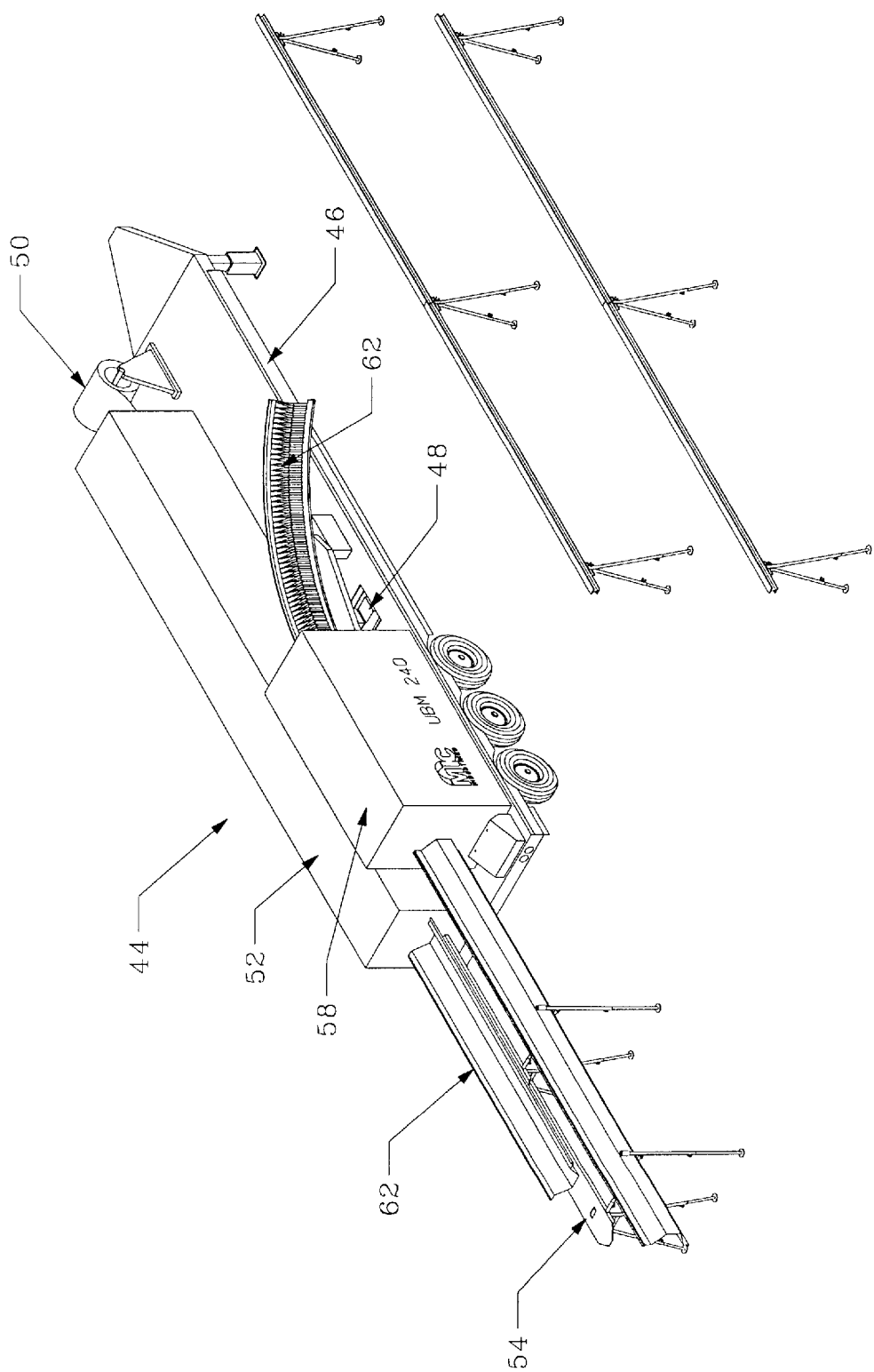
FIG. 6 shows an exemplary roll forming device into which the present invention can be incorporated.

FIG. 6 illustrates one exemplary mobile machine 44 into which the present invention can be incorporated. As shown, the machinery is mounted on a trailer 46 that has roll forming machinery components thereon powered via an engine 48. In the operation of the machinery, as is known in the art, a coil of metal 50, e.g., steel, is placed on a machine and runs through a forming section 52 to form a panel 62. A run-out table 54 can also be provided for receiving the formed panel and after the desired length of panel is formed, it is cut off by a guillotine shear on the machine (not shown). The formed panel is then turned sideways on the run-out table and fed back through a curving station 58, which curves the formed panel 62. In general, such a mobile machine for forming and bending sheet-metal into formed, curved panels is commercially available from M.I.C. Industries, Inc. of Reston, Va.

Figure 1:
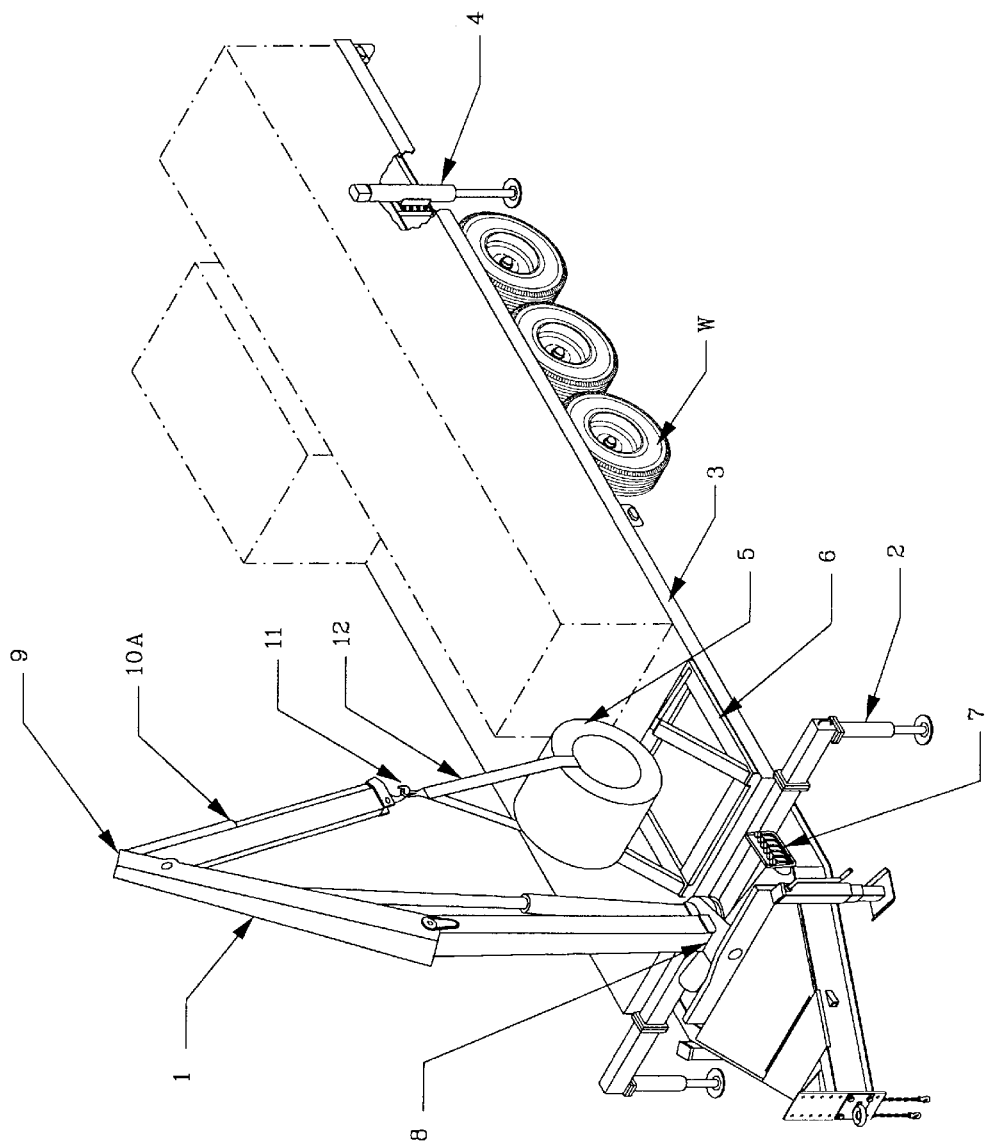
FIG. 1 is an isometric view depicting the crane in the loading position with the rear stabilizer jacks and the crane outrigger jacks shown in an extended or down position.

As shown in FIG. 1, the device according to the most preferred embodiment of the present invention incorporates the following preferred features into a trailer having a roll forming device: a crane 1 having a base 8, a knuckle joint 9 and a retraction member 10A; a crane hook 11 for attaching a coil of material 5 with a sling 12; front outrigger jacks 2; rear stabilizer jacks 4; and a control station 7.

Figure 3:
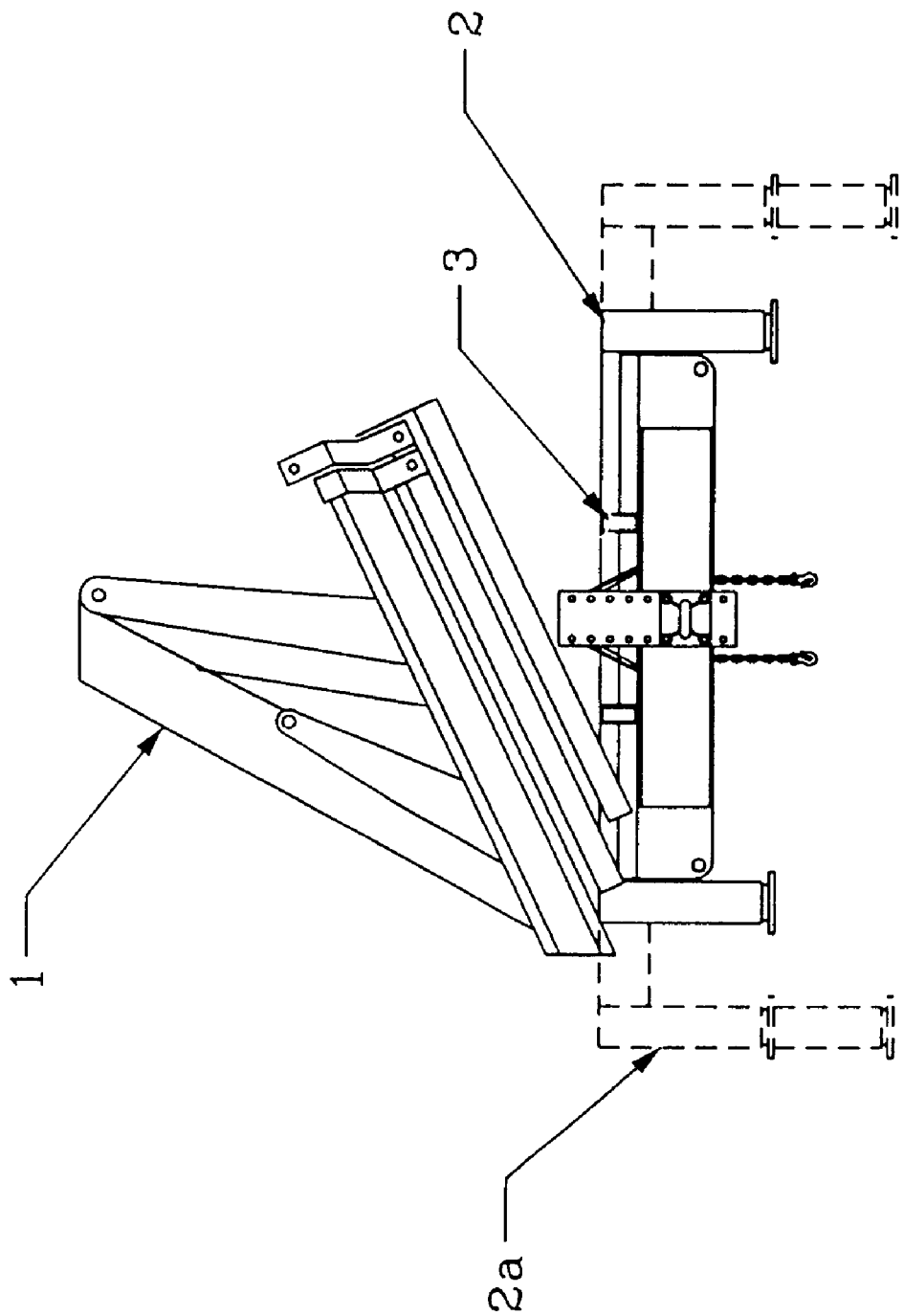
FIG. 3 is a front view showing the crane in its stored position and showing the outrigger jacks in their respective stored positions (solid lines) and in their fully extended positions (dashed lines).
Figure 4:
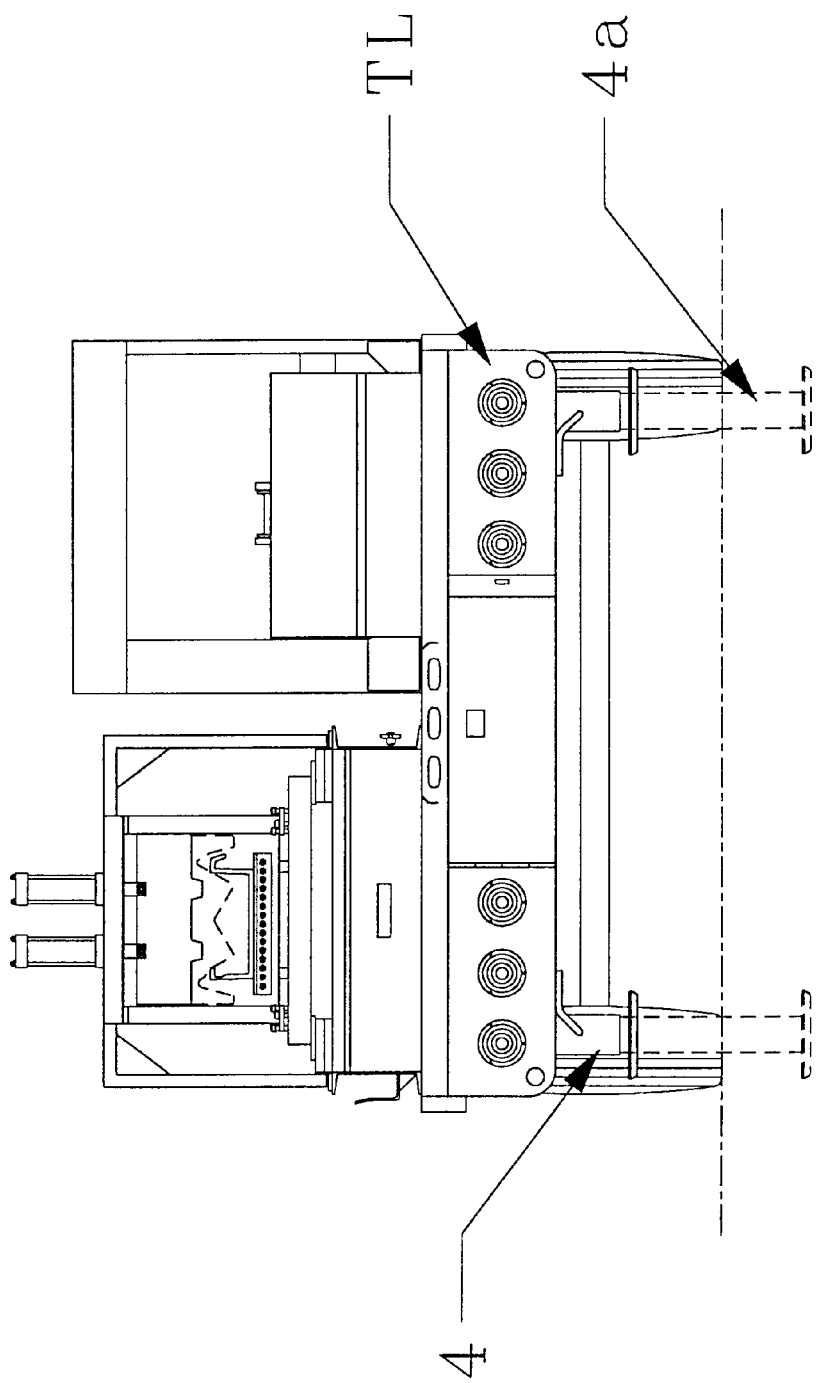
FIG. 4 is a rear view depicting the rear stabilizer jacks a stored position (solid lines) and in their fully extended positions (dashed lines).
Figure 5:
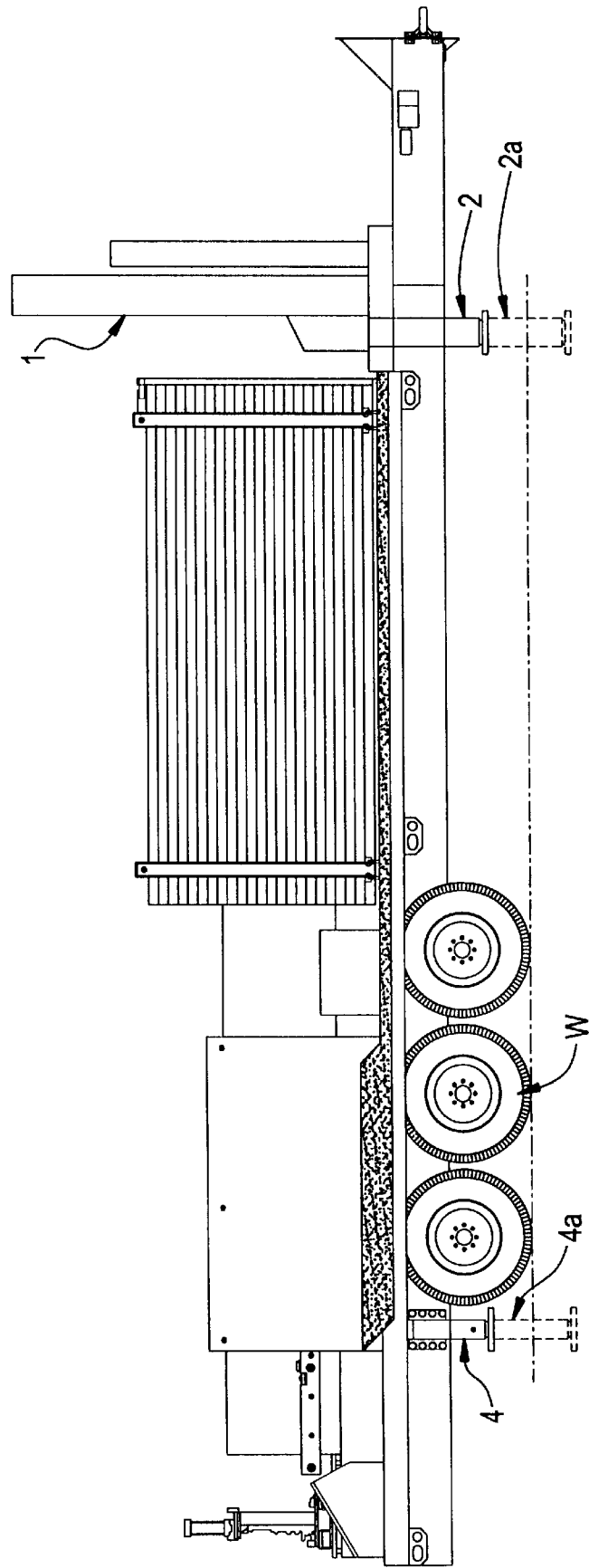
FIG. 5 is a side view of the embodiment shown in FIG. 1 with the crane at the front of the machine in the stored position, the outrigger jacks in the stored position, and the rear stabilizer jacks in the stored position. The extendable nature of both the front and rear stabilizer jacks is also depicted with the ground being used as a reference point.

The crane 1 and the leveling jacks 2 and 4 are preferably integrally connected to the frame 3 of the trailer in the preferred embodiments of the machine. FIG. 3 shows the front outrigger jacks 2 in a stored position (solid lines) and in a respective extended position 2a (dashed lines). The stored positions should be retracted a sufficient distance to allow clearance for traveling along roads and the like (e.g., when the trailer is pulled by a vehicle so as to roll via wheels W). Similarly, FIG. 4 shows rear stabilizer jacks 4 mounted to the main frame of the machine in a stored position (solid lines) and in an extended position 4a (dashed lines).

Both the outrigger jacks and the stabilizer jacks are preferably hydraulically operated to move in a vertical linear motion. The stabilizer jacks are preferably limited to up and down translational movement, while the outrigger jacks are also preferably extendable outward from the sides of the trailer as shown in dashed lines.

When the outrigger jacks and the stabilizer jacks are fully extended, they can provide a stable condition during coil transport via the crane 1 to and from the roll forming machine. The jacks can thus prevent overturning moments which could otherwise occur due to overloading of the crane. It is noted that cranes are usually rated to be able to lift a certain load safely. In this regard, capacity charts, otherwise known as overturning moment diagrams, are typically supplied with cranes. These diagrams often will describe what weight limits the crane can lift at certain boom positions. Here, diagrams could be provided to show the load limits of the crane both with and without the stabilizer jacks and/or the outrigger jacks in their down positions. The stabilizer jacks and the outrigger jacks, however, on the the machine are preferably used every time the crane is in use. That is, the stabilizer jacks and the outrigger jacks are preferably in their down positions at all times during coil material transport to and from the machine.

Figure 2:
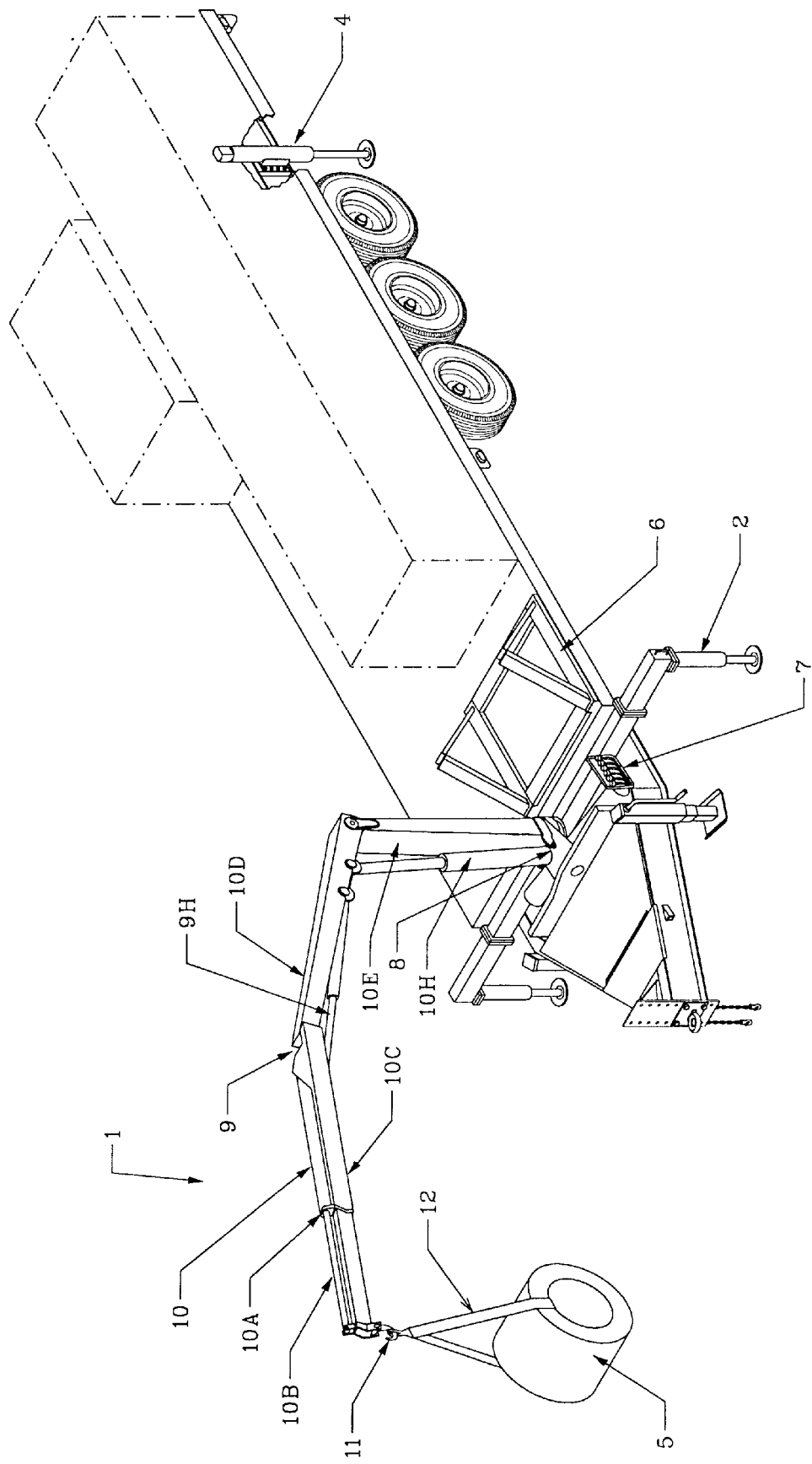
FIG. 2 is an isometric view depicting the crane in a typical pick position with the boom fully extended.

FIG. 2 depicts the crane in an exemplary pick-up position. At this position, a coil of material 5 is attached to the crane hook 11 through the use of an approved sling 12. The boom 10 preferably includes a portion that can be retracted once the coil of material 5 is safely attached to the crane. A joint of retraction 10A allows the linear adjustment of the crane 1 to occur, such as through the use of telescoping members. In this regard, a telescoping or linear action between portions 10B and 10C is preferably provided. This telescoping or linear action is preferably controlled hydraulically, such as via a hydraulic cylinder. Rotational motion about a generally vertical axis (although the position of this axis can vary depending on boom position) can preferably be achieved between a boom portion 10C and 10D at a knuckle joint 9 of the boom 10. A hydraulic cylinder 9H is preferably used to control this movement. Raising and lowering of the boom 10 is preferably achieved between boom portions 10D and 10E. In this regard, a hydraulic cylinder 10H is preferably provided to impart this movement as needed. Rotation about a vertical axis on a horizontal plane is also preferably provided by rotation at the base of the crane via a rotary base 8 mechanism. The vertical and horizontal references are to a standard x, y and z coordinate system, known as the global coordinate system.

The full range of motion of the crane is preferably controlled at an operator control station 7 located conveniently proximate the crane. The front outrigger jacks 2 are also preferably controllable from the control station 7. Similarly, the jacks 4 are also preferably controlled at the control station 7, but they could also be controlled at a control station proximate the jacks 4.

FIG. 1 shows the crane 1 in a loading/unloading position. In this regard, the boom 10 having already picked up the coil of material 5 can be maneuvered to face rearward in order to load the coil of material 5 on the spool stand 6. Once the coil of material 5 is placed and secured onto the spool stand 6, the crane 1 can be unhooked and can be maneuvered back to a stored (i.e., stowed) position as shown in FIG. 3. After the completion of the roll forming and the coil of material 5 has been expelled, the crane 1 can be maneuvered back into the loading/unloading position above the spool stand as shown in FIG. 1 to pick-up the emptied spool from the spool stand 6. Once unloading of the emptied spool is completed, the crane can either be used to make another pick-up of material for loading, or can be stored until future use or for transport.

Although this invention has been described with a degree of particularity in regarding to the preferred embodiments, it is to be understood that the present description is only by way of example, and changes in detail structure or assembly may be made without departing from the spirit of the invention. It is the intention, therefore, to be limited only by the scope of the appended claims.

What is claimed is:

1. A roll forming device, comprising:
 a) a trailer having a) a front end, a rear end, a left side and a right side, b) a hitch mechanism at said front end and c) a plurality of wheels;
 b) a sheet metal roll forming apparatus mounted to said trailer;
 c) a crane mounted to said trailer at said front end for moving materials to and from said roll forming apparatus, said crane having a boom that is configured to be positioned in a roll pick-up position with an end of said boom in front of said front end of said trailer, extending forward past a front end of said hitch mechanism;
 d) said boom being configured to be hydraulically extendable and retractable and hydraulically lowered and raised; and
 e) an operator control station to provide automatic operator control of said crane.

2. The device of claim 1, wherein said crane is mounted at a middle region of said front end proximate said hitch mechanism.

3. The device of claim 1, wherein said boom has a joint of retraction between two retraction members that are extendable and retractable with respect to one another.

4. The device of claim 1, wherein said boom has two members that are pivotally connected such that the boom can be lowered and raised.

5. The device of claim 1, wherein said crane is rotatable at least 360 degrees about a vertical axis.

6. The device of claim 1, wherein said boom includes a knuckle joint through which rotational motion about a generally vertical axis can be achieved.

7. The device of claim 1, further including a front stabilizer system including front stabilizer jacks.

8. The device of claim 7, wherein said operator control station is located at the front of the trailer proximate the crane.

9. The device of claim 8, wherein controls for operating the front stabilizer system are located proximate the controls for operating the crane.

10. The device of claim 7, wherein the crane and the front stabilizer system are hydraulically operated.

11. The device of claim 1, wherein leveling jacks are provided proximate the rear end of the trailer.

12. The device of claim 11, wherein the leveling jacks are hydraulically operated.

13. The device of claim 7, wherein the crane and the stabilizer jacks are fixedly mounted to a frame of said trailer.

14. The device of claim 1, wherein said crane includes a means for holding a coil of material at an end thereof.

15. The device of claim 1, wherein said crane is positionable at a coil pick-up position spaced from the trailer to pick up a coil of material and at a load/unload position upon said trailer to load and unload to and from the trailer.

16. The device of claim 3, wherein said retraction members telescope with respect to one another at said joint of retraction.

17. The device of claim 16, wherein said joint of retraction is proximate a distal end of said boom.

18. The device of claim 16, wherein said boom includes a pivot joint that pivots about a generally horizontal axis such that the boom can be lowered and raised.

19. The device of claim 18, wherein said joint of retraction is closer to a distal end of said boom than said pivot joint.

20. The device of claim 5, further including a rotary base to rotatably support said boom.

21. The device of claim 18, wherein said boom includes a knuckle joint through which rotational motion about a generally vertical axis can be achieved.

22. The device of claim 21, wherein said joint of retraction is closer to a distal end of said boom than said knuckle joint, and said knuckle joint is closer to said distal end of said boom than said pivot joint.

23. The device of claim 22, further including a rotary base to rotatably support said boom.

24. The device of claim 7, wherein said front stabilizer jacks are outwardly extendable from said left and right sides of said trailer.

25. The device of claim 2, further including a front stabilizer system including front stabilizer jacks, wherein said front stabilizer jacks are outwardly extendable from said left and right sides of said trailer.

26. The device of claim 1, wherein said roll forming device includes a curving station which curves sheet metal panels such that said panels have a curvature in a lengthwise direction of said panels.

27. A roll forming device, comprising:
  a) a trailer having a) a front end, a rear end, a left side and a right side, b) a hitch mechanism at said front end and c) a plurality of wheels;
  b) a sheet metal roll forming apparatus mounted to said trailer having an input proximate one of said ends of said trailer into which sheet metal is input into said roll forming apparatus;
  c) a crane mounted to said trailer adjacent said input to said roll forming apparatus for moving materials to and from said roll forming apparatus, said crane being mounted at a middle region of said one of said ends of said trailer.

28. The device of claim 27, wherein said one of said ends is said front end of said trailer and said crane has a boom that is configured to be positioned in a roll pick-up position with an end of said boom in front of said front end of said trailer extending forward past a front end of said hitch mechanism.

29. The device of claim 28, further including a stabilizer system including front stabilizer jacks, wherein said front stabilizer jacks are outwardly extendable from said left and right sides of said trailer.

30. The device of claim 29, wherein said stabilizer system further includes rear stabilizer jacks.

31. The device of claim 28, wherein said roll forming device includes a curving station which curves sheet metal panels such that said panels have a curvature in a lengthwise direction of said panels.

32. A roll forming device, comprising:
  a) a trailer having a hitch mechanism at a front end and a plurality of wheels;
  b) a sheet metal roll forming apparatus mounted to said trailer, said sheet metal roll forming apparatus having a curving station to form said panels into curved panels having a curvature in a lengthwise direction of said panels;
  c) a crane mounted to said trailer for moving materials to and from said roll forming apparatus;
  d) said crane having a boom that is extendable and retractable via a hydraulically powered joint of retraction and that is lowered and raised via a hydraulically powered pivot joint, at least a portion of said boom being rotatable about a vertical axis; and
  e) an operator control station to provide operator control of said crane.

33. The device of claim 32, wherein said at least a portion of said boom is rotatable about a vertical axis by the provision of a knuckle joint in said boom.

34. The device of claim 32, wherein said at least a portion of said boom is rotatable about a vertical axis by the provision of a rotary base for said boom.

35. The device of claim 32, further including a stabilizer system including front and rear jacks fixed at the front and rear ends of said trailer.

* * * * *